Sept. 20, 1932.  B. TOWNSHEND ET AL  1,878,554
ELECTRICAL SCALE
Filed Feb. 11, 1927  2 Sheets-Sheet 1
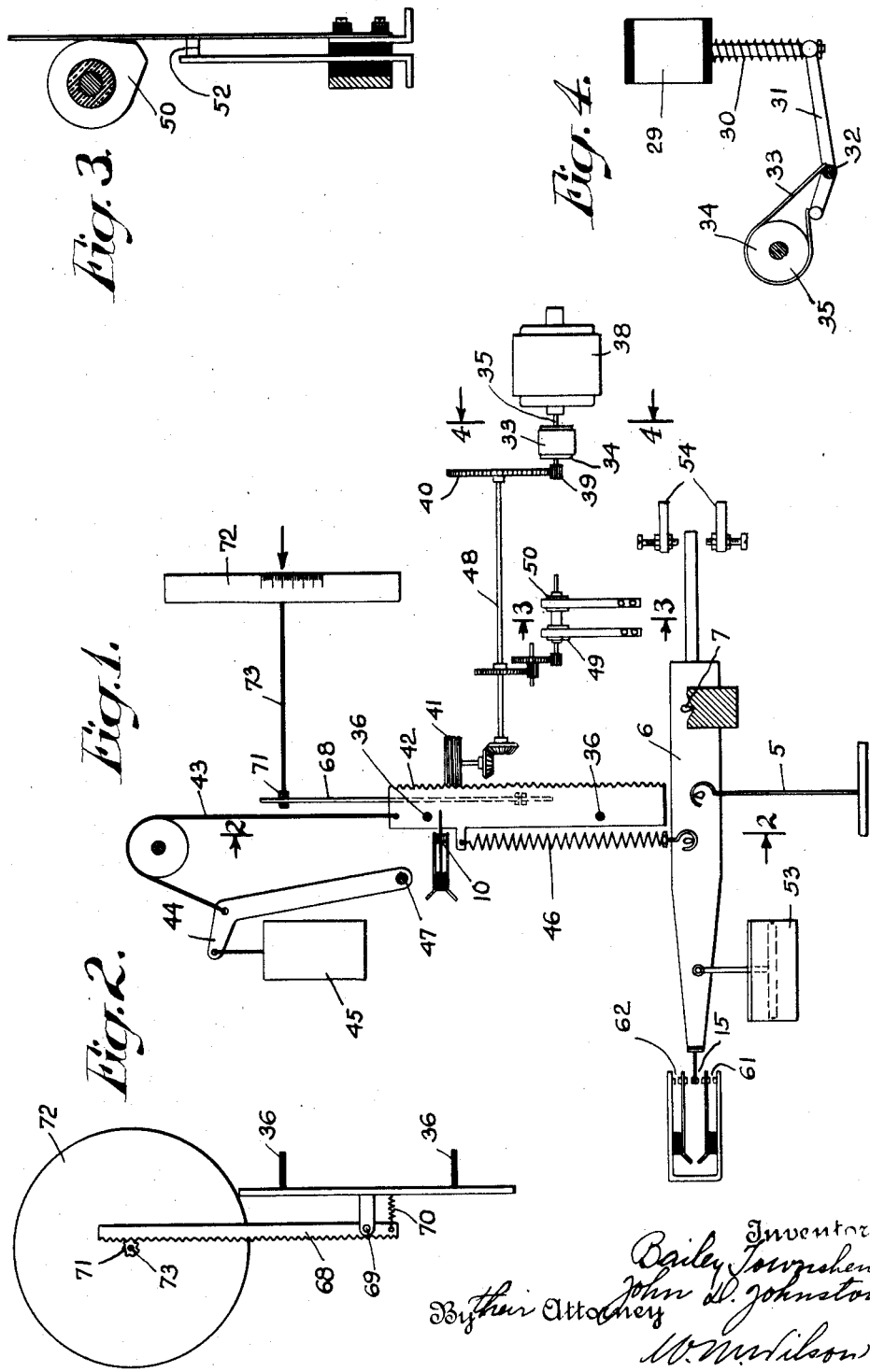

Sept. 20, 1932.   B. TOWNSHEND ET AL   1,878,554
ELECTRICAL SCALE
Filed Feb. 11, 1927    2 Sheets-Sheet 2

Patented Sept. 20, 1932

1,878,554

UNITED STATES PATENT OFFICE

BAILEY TOWNSHEND, OF JACKSON HEIGHTS, AND JOHN D. JOHNSTON, OF CORONA, NEW YORK, ASSIGNORS TO DAYTON SCALE COMPANY, OF DAYTON, OHIO, A CORPORATION OF NEW JERSEY

ELECTRICAL SCALE

Application filed February 11, 1927. Serial No. 167,395.

This invention relates to improvements in weighing scales and is directed particularly to improvements in load offsetting and weight indicating devices and means for driving and controlling same.

It relates in particular to the improvement in construction and operation in the invention disclosed in U. S. Patent No. 1,523,511 issued to J. W. Bryce, January 20, 1925.

An object of the invention is to provide means for holding scale beam circuits independent of scale beam contacts whereby the scale is brought to balance after a definite increment of load offsetting force without hesitation or jogging.

A further object of the invention is to provide means for coarse and fine adjustment whereby the moving parts throw into operation the coarse adjustment immediately when a heavy load is placed on the load support.

A still further object of the invention is to provide means for coarse and fine adjustments whereby the fine adjustment may be substituted for the coarse as the offsetting load comes to a definite zone range from true balance.

In carrying out the embodiment of the invention illustrated in the drawings there is provided means for utilizing an outside source of power such as a motor for actuating, controlling or setting the load offsetting mechanism. The source of power is also adapted to directly actuate the control of a suitable reading device such as a visible indicator, type wheel or perforating mechanism.

In most devices of this nature considerable and varying amounts of power are required for their operation thereby imposing frictional loads of such a character as to cause interference with accurate weighing. In the embodiment of this invention there is provided a yielding device such as a spring which is distended by the power motor to impart an increasing offsetting force to the scale beam parts until the latter are restored to a position of equilibrium. Suitable means are also provided for controlling the speed and direction of the motor thereby eliminating the possibility of the motor applying an excessive offsetting load in consequence of which hunting is abolished.

In the drawings

Fig. 1 is a diagrammatic layout of the mechanism showing the embodiment of the invention.

Fig. 2 shows a side elevation of the indicating mechanism taken on line 2—2.

Fig. 3 shows a side elevation of contact and cam taken on line 3—3.

Fig. 4 shows a side elevation of brake mechanism taken on line 4—4 of Fig. 1.

Figure 5:
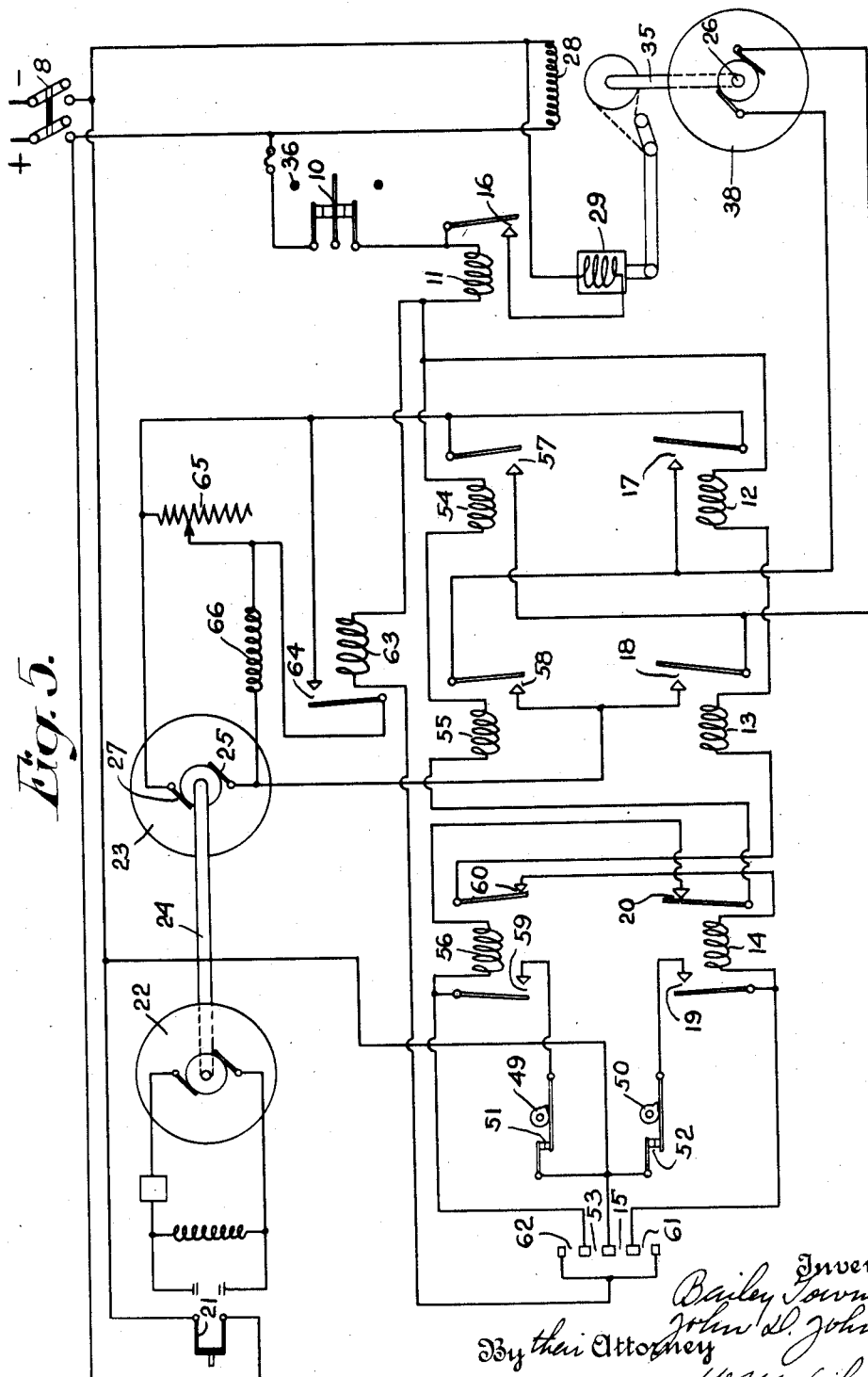
Fig. 5 is a diagrammatic layout of the wiring of the invention.

In Fig. 1 a beam rod 5 is connected to the main lever of a platform mechanism or other known load supporting mechanism. The weight or load on the platform will pull down on the beam rod 5 thus causing weight beam 6 pivoted at 7 to move downward closing contact 15.

Assuming that a weight is applied to the platform of sufficient size to close contacts 15 and 61, the closing of these contacts acts upon a series of relays in a manner to be later explained which in turn impress a voltage across the motor 38 causing it to run at a high speed and at the same time energize the solenoid magnet 29 (Fig. 4) thereby raising the plunger and the arm 31 attached thereto, pivoted at 32, thus slacking the tension on the brake band 33 and releasing it from the brake drum 34 which is fixed to the motor armature shaft 35. The motor is thus allowed to run freely and by means of the spur gear 39 fixed to the motor shaft and coacting with the gear 40 raises or lowers the rack 42 in accordance with the direction of rotation of the motor by means of the shaft 48 geared to the worm 41. The direction of rotation of the motor 38 is controlled by the upper and lower beam contacts as later explained.

The load applied to the beam rod 5 having lowered the beam the motor turns in such a direction as to raise the rack 42. Attached to this rack is a spring 46, the other end of said spring being attached to the weight beam 6. The raising of the rack therefore introduces increasing tension in the spring 46 tending to offset the pull on the beam rod 5. When the tension is sufficient to offset this load enough to break contact 61 but not contact 15 the speed of the motor is reduced thus allowing a finer adjustment for the final balance. The rack then continues to rise at a slower speed until the tension in spring 46 is sufficient to offset the applied load completely thus bringing the scale to balance and breaking contact 15 which causes the brake to be immediately applied, stopping the motor at once. Attached to the upper end of the rack is a flexible cord 43 of suitable material passing over a free running pulley and fastened at its other end to a bell crank 44 pivoted at 47. At the end of the bell crank is suspended a weight 45. As the rack 42 is raised the weight 45 is lowered and moved away from the pivot 47 so that the moment arm increases in direct proportion to the increase in tension of the spring 46 thereby producing a constant load at all times on the motor 38. Fastened to the rack 42 is another rack 68 (Fig. 2), pivoted at 69 and held against a pinion 71 by means of tension in the spring 70. This pinion is fixed to the shaft 73 to which in the particular embodiment of this invention is fastened a visible indicator drum 72, the finest divisions on which correspond to the smallest increments in weight to which the device is sensitive. A type wheel or punching cylinder could just as readily be placed on this shaft 73 and operated in connection with a separate printing or punch receiving mechanism.

Cams 49 and 50 control interlocking contacts which will be explained later. Pins 36 on the rack are limit pins so that a load in excess of the capacity of the scale will cause the pins to open the safety contact 10. Dash pot 53 is to damp the oscillations of the scale beam and limiting stops 54 are to limit the travel of the scale beam.

Referring now to Fig. 5 and assuming that switches 8 and 21 are closed the motor 22 is set in operation driving the generator 23 through the shaft 24. If now a weight is applied to the platform to depress beam 6 sufficiently to close contact 15 without closing contact 61 a complete circuit starting from the positive terminal may be traced as follows: through contact 10, relay 11, motor relays 12, 13 and 14, beam contact 15, back to the negative side of the line. The current passing through this circuit energizes the relays 11, 12, 13 and 14 thus closing the contacts 16, 17, 18 and 19 and opening contact 20. With the contacts 17 and 18 closed low voltage current passes from generator contact 25 through contact 18, motor armature 26, contact 17 to generator brush 27. The armature 26 then rotates, the field 28 being directly across the main line. It will be noted that the relay 11 is so placed that it is energized whenever current is established through either branch of the motor relay group. Thus whenever any of the upper or lower beam contacts close the relay contact 16 is also closed thereby energizing the brake solenoid 29 so that the brake on the operating motor is released every time one of the beam contacts makes a circuit, the method of release having been previously explained.

With the motor 38 in operation the action of the scale mechanism is, as before described, applying the offsetting load until the beam comes to balance breaking contact 15 thus deenergizing all relays, applying the brake and stopping the motor.

Coordinated to the shaft 48 (Fig. 1) by means of a gear train are two cams 49 and 50 which serve to open and close the contacts 51 and 52 at definite increments of load offset. One cam and contact is shown in Fig. 3. The closing of contact 15 as previously described causes the contact 19 to close which allows current to pass through contact 52 thus bridging the beam contact 15 so that if this now opens it will not affect the flow of current. The contact 52 is opened at regular intervals by the cam 50 which is geared to the load offset mechanism as previously described. For example, let us assume that contact 52 is opened after every application of load offsetting corresponding to the least weight which the scale is designed to weigh. If when contact 52 is opened contact 15 is likewise open due to sufficient counter force having been applied to the beam the current in the circuit through relays 11, 12, 13 and 14 will be interrupted causing all the relay contacts to open and thus stopping the motor.

The closing of contact 19 establishes a short circuit around contact 15 through cam actuated contact 52. This cam operates in conjunction with the load offsetting mechanism so as to momentarily open contact 52 after each application of a certain definite load offsetting force. This ensures that any contact of 15 sufficient to start operation will result in applying at least a certain definite amount of load offsetting effort. This amount is set to be that necessary to force the member 6 back to its equilibrium position when the unbalance is just enough to cause grazing contact at 15. Thus if we are dealing with a heavy capacity scale whose tolerance, or least amount the scale is expected to indicate, is one-half pound the motion of 6 would be designated to just make good contact with an unbalance of one-half pound and the cam would be adjusted to apply a unit load offsetting effort of the same amount. With this arrangement the automatic balancing of the scale is made certain and definite; spasmodic or uncertain action due to light contact pressures are obviated. The scale continues in operation, once having been started by displacement of the beam, under control of the cam contact which opens periodically to determine whether or not balance has been reached.

If the force acting on the beam through the load offsetting mechanism is greater than that due to the weight on the scale platform owing to the weight being removed from the latter or to the load offsetting mechanism running beyond the correct amount, the action is similar to the above description except contact 53 is now closed by the beam energizing relays 54, 55, 56 and thus closing contacts 57, 58, 59 and opening contacts 60. The circuit now is as follows: from generator brush 25, through contact 58, motor armature 26, contact 57, to brush 27. It will be noted that the direction of flow of the current from the generator through the motor is the reverse of that shown in the previous case thus reversing the direction of the motor and consequently causing the load offsetting force to diminish until the contact 53 is broken as the scale again comes to balance, whereupon the operation ceases as before described due to the deenergization of the relay coils 11, 54, 55 and 56 under control of the cam operated locking contact 51.

It will be noticed that the current which passes through the motor relays also passes through contact 10 normally closed. This contact merely serves as a safety device being automatically opened by pin 36 as explained in connection with Fig. 1.

The operation of the circuit has now been fully described as it takes place when the unbalanced force acting on the scale beam is sufficient to close either of the contacts 15 or 53 but insufficient to close contacts 61 or 62. When the unbalance load is sufficient to close contacts 61 or 62 in addition to contacts 15 or 53 the relay 63 is energized. Energizing this last named relay closes contact 64 which shortcircuits the resistance 65 in series with the generator shunt field 66. The result therefore of applying an excessive unbalance load is to apply a higher voltage to the motor armature 26 through the same circuits as previously described thus causing the motor 38 to rotate more rapidly to increase or decrease the load offsetting force at a greater rate until sufficient offset has been applied to reduce the unbalance force so that contacts 61 or 62 break, at which time the circuits controlled by contacts 15 or 53 alone function thus operating the motor at a slower speed until the final balance is reached, breaking the complete circuit and bringing the motor to rest. The rapid operation of the motor 38 constitutes coarse adjustment of the load offsetting device and slow operation constitutes the fine adjustment.

When contact 20 opens due to the closing of beam contact 15 it breaks the circuit through the relays 56, 55 and 54 so that should the load on the platform be suddenly removed before the balance on the scale has been established the sudden closing of the contact 53 would not cause relays 54, 55 and 56 to operate until the relays 12, 13 and 14 had become deenergized. This prevents a shortcircuit from occurring across the generator terminal. Similarly contact 60 is an interlock to prevent energization of relays 12, 13, 14 while current is flowing through relays 54, 55, 56.

While we have shown and described and pointed out the fundamental novel features of the invention as applied to a single modification it will be understood that various missions and substitutions and changes in the form and details of the device illustrated and in its operation may be made by those skilled in the art without departing from the spirit of the invention. We intend to be limited therefore only as indicated by the scope of the following claims:

1. In a weighing scale comprising a member movable in response to a weighing load and associated yielding load offsetting means, a motor permanently and directly connected to said means for actuating the same and means controlled in accordance with movements of said movable member for automatically operating said motor at different speeds in response to different weighing loads.

2. A weighing scale comprising a member movable in response to a weighing load and associated yielding load offsetting means, a motor permanently and directly connected to said means for actuating the same and means controlled by the movable member for automatically operating said motor at different speeds in response to different weighing loads.

3. A weighing scale comprising a member movable in response to a weighing load and associated load offsetting means, a motor permanently and directly connected to said means for actuating the same and means controlled by the movable member for automatically operating said motor at different speeds in response to different weighing loads and means automatically operable upon the removal of said weighing load, for reversing the direction of said motor.

4. A weighing scale comprising a member movable in response to a weighing load and associated load offsetting mechanism, a driving motor for actuating said mechanism, means controlled by the movable parts of the scale for controlling the driving motor and additional simultaneously operated controlling means for assuming control of the driving motor after it starts operating.

5. A weighing scale comprising a member movable in response to a weighing load, a load offsetting mechanism, a driving motor for actuating said mechanism, means controlled by the moving parts of the scale for operating the driving motor and means for removing the control of the driving motor from the controlling means after the motor starts operating and having provisions to periodically restore the control of the driving motor thereto during the continuous operation of said motor.

6. A weighing scale comprising a member movable in response to a weighing load, a load offsetting mechanism, a driving motor for actuating said mechanism, means associated with said motor to bring the moving parts of the scale to balance and means controlling said motor to bring said parts to balance only at definite increments of load offsetting force.

7. A weighing scale comprising a member movable in response to a weighing load, a load offsetting mechanism, a driving motor for actuating said mechanism, means including a relatively movable chart and indicator for indicating the weighing load, and means controlling said motor to bring the scale to balance only when the pointer coincides with a weight increment indication on the chart.

8. A weighing scale comprising a member movable in response to a weighing load and associated load offsetting means, a driving motor for actuating said load offsetting mechanism, a plurality of controls for operating the driving motor and means controlled by said member for preventing more than one control operating at one time.

9. A weighing scale comprising a member movable in response to a weighing load and associated load offsetting means, a single motor permanently and directly connected to said means for coarse and fine operation of the load offsetting means when a weight is applied and means controlled by the movable member for the motor to return said load offsetting means when the weight is removed.

10. A weighing scale comprising load offsetting means and indicating means controlled thereby, a motor with means for controlling the same by movable scale parts for operating said load offsetting means and means for removing control of the motor from the movable scale parts and restoring it intermittently thereto at predetermined indications by the indicating means.

11. In a weighing scale, a member movable in response to a weighing load and associated load offsetting means, a motor permanently and directly connected to said means for operating the same, means operated by the said motor for indicating the weighing load and consisting of a relatively movable graduated chart and indicator and means controlled by the motor for interrupting the motor circuit when the scale comes to balance only when the indicator coincides with one of the graduations representing the least increment of weight the scale is designed to weigh.

12. A weighing scale comprising a member movable in response to a weighing load and associated load offsetting means, a motor for actuating said load offsetting means, a motor generator for operating said motor and means controlled by the movable parts of the scale for varying the field strength of said generator.

13. A weighing scale comprising a scale beam and associated load offsetting means, a motor for actuating said means, a circuit therefore containing two sets of contacts for controlling said motor, one set operated by the scale beam and the other set operated by the motor.

14. A weighing scale comprising a scale beam and load offsetting mechanism associated therewith, a motor for operating said load offsetting mechanism, a circuit for said motor and control means for said circuit including a pair of contacts actuated by said scale beam when out of load balancing position and a second pair of contacts and means operated by the motor for intermittently actuating them for removing the control of the circuit from said scale beam contacts and intermittently restoring it thereto during the operating period of the motor.

15. A weighing scale comprising a member movable in response to a weighing load and associated load offsetting means, a single driving motor for actuating said load offsetting means, a plurality of controls operable in response to a weighing load for operating the driving motor in one direction and means whereby the operation of one control prevents the operation of the other.

16. A weighing scale comprising a member movable in response to a weighing load and associated load offsetting means, an electric motor for actuating the load offsetting means, a motor generator for providing a source of power of variable voltage for the armature of said motor, a different source of power of constant voltage for the field of said motor, and means controlled by the movable scale parts for varying the armature voltage in response to different weighing loads.

17. A weighing scale comprising a member movable in response to a weighing load and associated load offsetting means, an electric motor for actuating the load offsetting means, a motor generator for providing a source of power of a variable voltage for the armature of said motor, a different source of power of constant voltage for the field of said motor, and means controlled by the movable scale parts for varying the generator voltage in response to different weighing loads.

18. In a scale, a load offsetting means, a motor for controlling said means, a control for the motor comprising a device controlled by the load, and also comprising a second device independent of load control and invariably set in operation by the first-named device.

In testimony whereof we hereto affix our signatures.

BAILEY TOWNSHEND.
JOHN D. JOHNSTON.